Patented Oct. 20, 1953

2,656,336

UNITED STATES PATENT OFFICE 2,656,336

METHOD OF PREPARING DYE-RECEPTIVE ACRYLONITRILE POLYMERS

George E. Ham, Dayton, Ohio, assignor, by mesne assignments, to The Chemstrand Corporation, a corporation of Delaware No Drawing. Application July 23, 1949, Serial No. 106,490

14 Claims. (Cl. 260—85.5)

This invention relates to a new fiber forming polymer having unusual physical properties. More specifically this invention relates to a method of preparing polymers capable of being dyed by conventional methods and of being fabricated into desirable colored fibers.

It is well known that polyacrylonitrile and copolymers of 75 percent or more of acrylonitrile and up to 25 percent of other olefinic monomers have very desirable fiber forming properties. Polymers prepared from acrylonitrile and olefinic monomers, such as methacrylonitrile, vinyl acetate, styrene, methyl methacrylate and methyl acrylate cannot be dyed satisfactorily by conventional methods. This is especially true of the compact and impervious fibers formed by dry spinning operations, that is, by the extrusion of solutions of the polymer into gaseous atmospheres which remove the solvent and precipitate the polymer in a continuous form. It is also well known that acrylonitrile copolymers may be made dye receptive by copolymerizing the acrylonitrile with a substantial proportion of a basic vinyl monomer, for example vinyl pyridine. The expedient is not generally practicable because of the cost of the basic vinyl monomer, and because of the reduced yield and low molecular weight of the copolymer containing substantial proportions of the said basic monomer.

The primary purpose of this invention is to provide a new copolymer of acrylonitrile having fiber forming properties and being capable of dyeing by conventional methods. A further purpose of this invention is to provide a very inexpensive dye receptive acrylonitrile copolymer of unitary composition. A still further purpose of this invention is to provide a new and valuable method of preparing colored synthetic fibers from acrylonitrile copolymers.

It has been discovered that the problem of dyeing acrylonitrile fibers may be conveniently solved by utilizing a copolymer of acrylonitrile and a vinyl ester of halogen substituted monocarboxylic acid which copolymer has subsequently been treated with an amine. Suitable vinyl esters for copolymerization with acrylonitrile are: vinyl chloracetate, vinyl bromoacetate, vinyl α-chloropropionate, vinyl β-chloropropionate, a vinyl α-chloro-n-butyrate, vinyl α-chloroisobutyrate and homologous vinyl esters of carboxylic acids having up to eight carbon atoms, which have at least one chlorine, bromine, iodine, or fluorine atom substituted thereon. The useful copolymers will in all cases be copolymers of 75 to 98 percent by weight of acrylonitrile and from two to 75 percent of the vinyl esters. Preferred copolymers are the chloro-derivatives because of their low cost, the α-substituted carboxylic acids because of the greater reactivity of the halogen in the α-position, and those of 80 to 95 percent acrylonitrile because of the superiority in both dye receptivity and fiber properties.

The intermediate copolymers of acrylonitrile and the vinyl esters of halogen substituted carboxylic acid may be prepared by any polymerization procedure, but the preferred practice utilizes emulsion polymerization procedures wherein the copolymer is prepared in finely divided solid form for immediate use in the fiber fabrication operations. The preferred emulsion polymerization may utilize batch procedures wherein the monomers are charged with an aqueous medium containing the necessary catalysts and dispersing agents. A more desirable method involves the semi-continuous procedure, in which the polymerization reactor containing the aqueous medium is charged with the desired monomers gradually throughout the course of the reaction. Entirely continuous methods may also be used in which the monomers are gradually introduced to the reactor and the copolymers removed continuously.

The polymerization is catalyzed by means of any water soluble peroxy compound, for example sodium peroxide, hydrogen peroxide, sodium perborate, the sodium salts of other peroxy acids, the potassium, ammonium and other water soluble salts of peroxy acids, and any other water soluble compound containing a peroxy group (—O—O—). A wide variation in the quantity of peroxy compound is possible. For example, from 0.1 to 3.0 percent by weight of the polymerizable monomer may be used. The catalyst may be charged at the outset of the reaction, or it may be added continuously or in increments throughout the reaction for the purpose of maintaining a more uniform concentration of catalyst in the reaction mass. The latter method is preferred because it tends to make the resultant polymer more uniform in its chemical and physical properties.

Although the uniform distribution of the reaction throughout the reaction mass can be achieved by vigorous agitation, it is generally desirable to promote the uniform distribution of reagents by using wetting agents, or emulsion stabilizers. Suitable reagents for this purpose are the water soluble salts of fatty acids, such as sodium oleate and potassium stearate, mixtures of water soluble fatty acid salts, such as common soaps prepared by the saponification of animal and vegetable oils, the "amino soaps," such as salts of triethanolamine and dodecylmethylamine, salts of rosin acids and mixtures thereof, the water soluble salts of half esters of sulfuric acid and long chain alkyl alcohols, sulfonated hydrocarbons, such as alkyl aryl sulfonates, and any other of the wide variety of wetting agents, which are in general organic compounds containing both hydrophobic and hydrophilic radicals. The quantity of emulsifying agent will depend upon the particular agent selected, the ratio of monomer to be used, and the conditions of polymerization. In general, however, from 0.01 to one percent by weight of the monomers may be employed.

The preferred methods of operation are those which produce a copolymer of very uniform chemical and physical properties. Other characteristics of the copolymer are frequently of great importance, for example the particle size of the dispersion, which is primarily concerned with the ease of filtration, the water to monomer ratio, which must necessarily be low for the most economical production, and the yield and conversion of the monomers to copolymer. The optimum methods of production are the subject matter of copending patent applications.

In application Serial No. 5,482, filed by George E. Ham on January 30, 1948 (now issued as U. S. Patent No. 2,559,154), there is described and claimed a method of polymerization adapted to produce polymers of very uniform chemical and physical properties. This method, which involves the continuous addition of the pre-mixed monomers to an aqueous polymerization medium at a rate which varies such that the operation is maintained at a constant reflux temperature, is useful in the practice of this invention.

In application Serial No. 101,490 filed June 25, 1949, by George E. Ham, there is described and claimed a polymerization method which is useful in the preparation of a high yield of a fine granular polymer which is readily filtered and washed by conventional procedures. This method involves the polymerization of acrylonitrile copolymers in the presence of a mahogany soap, a sulfonated hydrocarbon residue derived from petroleum refining operations.

In copending application Serial No. 101,489 filed June 25, 1949, by Costas H. Basdekis (now issued as U. S. Patent No. 2,548,282), there is described and claimed another procedure which is useful in the fabrication of the new copolymer. This method is particularly useful in the preparation of polymers utilizing low water to monomer ratios and involves a particular formulation of alkali metal salts of persulfuric acid and mahogany soap. By this method low water-monomer ratios may be used without encountering the usual difficulties of viscous reaction masses and poor elimination of heat of reaction due to low heat transfer rates.

The emulsion polymerizations are preferably conducted in glass or glass-lined vessels which are provided with a means for agitating the contents. Generally rotary stirring devices are the most effective means of insuring the intimate contact of the reagents, but other methods may be successfully employed, for example by rocking or tumbling the reactors. The polymerization equipment generally used is conventional in the art and the adaptation of a particular type of apparatus to the reaction contemplated is within the province of one skilled in the art.

The optimum polymerizations for fiber formation involves the use of polymerization regulators to prevent the formation of polymer units of excessive molecular weight. Suitable regulators are the alkyl and aryl mercaptans, β-mercaptoethanol, carbon tetrachloride, chloroform, dithioglycidol and alcohols. The regulators may be used in amounts varying from .001 to two percent on the weight of the monomer to be polymerized.

When the polymerization is complete the polymer is separated from the aqueous medium by any of the conventionally used methods. If the dispersion is very stable it may be necessary to break the emulsion, for example by adding acids, bases, salts or alcohol. When the optimum procedures above described are used the polymer may be separated from the aqueous phase by filtration. The resulting polymer in either case may require washing operations to remove traces of soluble catalyst or dispersing agent.

The solid granular copolymer of acrylonitrile and vinyl esters of α-chlorocarboxylic acid is useful in the preparation of fibers by conventional methods. The preferred practice involves the preparation of spinning solutions by dispersing the polymer in suitable solvents, for example N,N - dimethylformamide, N,N - dimethylacetamide, gamma-butyrolactone and ethylene carbonate. The polymer solutions are fabricated into fibers by extrusion through a suitable die, or a spinneret containing a plurality of minute apertures, into a medium which removes the solvent and causes the polymer to precipitate in a continuous linear form. The said medium may be a liquid, for example water, or aqueous solutions of acids, bases, or salts, or it may be a gas, for example air or any gas which is inert with respect to the polymer.

The intermediate polymers are rendered dye deceptive by a chemical reaction involving the substitution of the α-chlorine atom with ammonia or a primary, secondary or tertiary amine. Useful amines are the primary amines, such as methylamine, n-butylamine, ethylene diamine or ethanolamine, the secondary amines, such as diethylamine, ethyl isopropylamine, dicyclohexylamine, and diethanolamine, the tertiary amines, for example triethanolamine, pyridine, morpholine, trimethylamine, and hexamethylenetetramine and the various mixed amines, for example N-ethyltrimethylene diamine, diethylene triamine, triethylene tetramine, tetraethylene pentamine. The amine treatment which renders the intermediate copolymers into dye receptive new polymers may be conducted with the polymer in a granular solid state as obtained from the polymerization reaction. In this modification the polymer is dispersed with the amine for sufficient time to react the available chlorine atoms with the amine. When the reaction has been completed the excess amine may be removed by evaporation or by chemically binding it with a suitable reagent. The polymer is then dispersed in the solvent and the fiber spun in the usual manner.

If desired the new copolymer may be dissolved in the solvent before being treated with the amine. The solution is then mixed with sufficient amine to react with all or part of the available chlorine atoms. The fiber so spun has more desirable dyeing properties because in solution state a larger proportion of the chlorine atoms are available for reaction.

A still further procedure involves the spinning of the new polymers in the conventional manner, followed by treatment of the fibers with the amine in order to substitute the amino groups on the available chlorine atoms of the polymer. This method may be preferred where spinning from relatively concentrated solutions is desired.

Further beneficial effect in dyeing can be achieved if the amine salt made by the reaction of the chlorine atoms with the amine or ammonia is neutralized by means of a weak alkaline reagent, such as sodium bicarbonate, sodium carbonate, a quaternary ammonium hydroxide or sodium acetate. Thus the amino salt radicals are converted to amino groups.

Further details of this invention are set forth with respect to the following examples.

*Example 1*

A glass reaction flask, provided with a dropping funnel, a thermometer and a rotary stirring mechanism, was charged with 740 grams of distilled water and one gram of the sodium salt of mahogany acids and heated to 75–76° C. A mixture of 160 grams of acrylonitrile and 40 grams of vinyl α-chloroacetate was added gradually to the reaction mass through the dropping funnel at a rate which required sixty-five minutes for complete charging. A solution of one gram of potassium persulfate and 60 grams of water was prepared and added in six equal increments to the reaction mass, one increment initially and the other increments at ten minute intervals. After all of the monomers had been added the mixture was refluxed for thirty minutes and then steam distilled to remove unreacted monomers, 27 grams of monomers being recovered. The polymer which was separated by filtration was recovered in a 79.6 percent yield. Analysis of the polymer showed that it was a copolymer of 87.1 percent acrylonitrile and 12.9 percent vinyl α-chloroacetate. The polymer was dissolved in N,N-dimethylacetamide to form a seventeen percent solution which was extruded into an aqueous medium. After stretching 600 percent the physical properties of the fiber were measured and found to be: tenacity 3.65 grams per denier, 16.6 percent boil shrinkage, 6.7 percent elongation and 84 percent wet strength.

*Example 2*

A ten percent solution of the copolymer formed in the preceding example was dissolved in dimethylacetamide. The solution was mixed with 0.79 percent of diethylamine. The solution was then spun into an aqueous medium at 60° C. and stretched 600 percent in a steam atmosphere. The fiber was found to have a tensile strength of 2.3 grams per denier and a boil shrinkage of 22 percent. A one gram sample of fiber was neutralized with a saturated solution of sodium bicarbonate, washed and dyed in a dye bath of 40 grams of water and 1 cc. of two percent Polar Red B and 5 cc. of three percent sulfuric acid for fifteen minutes at 60°. A good wash-fast red fiber was thereby obtained.

*Example 3*

A seventeen percent solution in dimethylacetamide was prepared from the copolymer described in Example 1, and 2.37 percent of triethanolamine was added. The mixture was heated at 80° C. for fifteen minutes and then spun by extruding through a spinneret into a mixture of 67 percent dimethylacetamide and 33 percent water. The fiber was stretched 800 percent in a steam atmosphere and found to possess a tensile strength of 4.2 grams per denier and a boil shrinkage of twelve percent. A one gram sample of the fiber was treated in a dye bath containing 80 cc. of water, 2 cc. of two percent Polar Red B and 10 cc. of three percent sulfuric acid for fifteen minutes at 60° C. A deep red color was developed on the fiber.

*Example 4*

The fiber prepared in accordance with Example 2, was dyed for one hour at 60° C. in a bath containing 1200 parts of water, two parts of acetic acid, ten parts of sodium chloride, and one part of Wool Fast Scarlet G Supra. A brilliant scarlet shade was produced on the fiber.

*Example 5*

Using the procedure described in Example 1, a mixture of 184 grams of acrylonitrile and 16 grams of vinyl α-chloroacetate was polymerized at a temperature of 80–81° C. The copolymer was produced in a yield of 89.2 percent and was found to contain 93.6 percent of acrylonitrile and 6.4 percent of vinyl α-chloroacetate. A twelve percent solution in dimethylacetamide was spun into water and a fiber with a tenacity of 3.44 grams per denier and a boil shrinkage of thirteen percent was recovered.

*Example 6*

A procedure similar to Example 1 was used to polymerize a mixture of 184 grams of acrylonitrile and 16 grams of vinyl α-chloroacetate. The mixed monomers were added to 280 grams of water containing dissolved therein 0.2 gram of sodium salt of mahogany acids. A solution of two grams of potassium persulfate in 120 grams of water was added in six equal increments throughout the reaction. The temperature was maintained at 80–81° C. and the monomers were added over a period of 75 minutes. The resulting copolymer, after treatment with triethanolamine, was found to be dye receptive.

*Example 7*

A fiber produced in accordance with Example 1, was heated with triethanolamine for five minutes at 90° C. After neutralization with a saturated solution of sodium bicarbonate at 40° C. for five minutes the fiber was found to be dye receptive.

Various copolymers of acrylonitrile and vinyl acetate were prepared in fiber form by both wet and dry spinning procedures. The dry spun fibers were found to be totally unreceptive of dye, whereas the wet spun fibers were found to absorb only a small and insufficient amount of dye.

The invention is defined by the following claims.

I claim:

1. A method for preparing a dye-receptive fiber which comprises reacting a fiber of a copolymer of from 75 to 98 per cent of acrylonitrile and from two to 25 per cent of a vinyl ester of a monocarboxylic acid having up to eight carbon atoms and a halogen atom substituted on the alpha carbon atom with an amino compound of the group consisting of primary alkylamines, secondary alkyl amines, ethanol amines, pyridine, morpholine, polymethylene polyamines, and the cyclohexyl amines, wherein the alkyl groups, the ethanol groups, the polymethylene groups, and the cyclohexyl groups contain no other substituents.

2. The method defined by claim 1 wherein the amino compound is a monoalkylamine in which the alkyl group is a hydrocarbon group.

3. The method defined by claim 1 wherein the amino compound is a dialkylamine in which the alkyl group is a hydrocarbon group.

4. The method defined by claim 1 wherein the amino compound is a polymethylene polyamine in which the alkyl group is a hydrocarbon group.

5. The method defined by claim 1 wherein the vinyl ester is vinyl chloroacetate.

6. The method defined by claim 1 wherein the vinyl ester is vinyl chloropropionate.

7. The method defined by claim 1 wherein the vinyl ester is vinyl chlorobutyrate.

8. A dye-receptive fiber which comprises a fiber of a copymer of from 75 to 98 per cent by weight of acrylonitrile and from two to 25 per cent of a vinyl ester of a monocarboxylic acid having up to eight carbon atoms and a halogen atom substituted on the alpha carbon atom, said fiber having been treated with an amino compound of the group consisting of primary alkyl amines, secondary alkyl amines, ethanol amines, pyridine, morpholine, polymethylene polyamines and the cyclohexyl amines, wherein the alkyl groups, the ethanol groups, the polymethylene groups, and the cyclohexyl groups contain no other substituents.

9. The product defined by claim 8 wherein the amino compound is a monoalkylamine in which the alkyl group is a hydrocarbon group.

10. The product defined by claim 8 wherein the amino compound is a dialkylamine in which the alkyl group is a hydrocarbon group.

11. The product defined by claim 8 wherein the amino compound is a polymethylene polyamine in which the alkyl group is a hydrocarbon group.

12. The product defined by claim 8 wherein the vinyl ester is vinyl chloroacetate.

13. The product defined by claim 8 wherein the vinyl ester is vinyl chloropropionate.

14. The product defined by claim 8 wherein the vinyl ester is vinyl chlorobutyrate.

GEORGE E. HAM.

References Cited in the file of this patent

UNITED STATES PATENTS

| Number | Name | Date |
|---|---|---|
| 1,984,417 | Mark | Dec. 18, 1934 |
| 2,354,210 | Jacobson | July 25, 1944 |
| 2,404,720 | Houtz | July 23, 1946 |
| 2,436,926 | Jacobson | Mar. 2, 1948 |

FOREIGN PATENTS

| Number | Country | Date |
|---|---|---|
| 597,368 | Great Britain | Jan. 23, 1948 |
| 613,817 | Great Britain | Dec. 3, 1948 |
| 239,217 | Switzerland | Jan. 3, 1946 |